United States Patent [19]
Promny

[11] Patent Number: 5,497,697
[45] Date of Patent: Mar. 12, 1996

[54] TUMBLER BASKET

[76] Inventor: Lech Promny, 2032 Saxon Road, Oakville, Ontario, Canada, L6L 2V2

[21] Appl. No.: 372,946

[22] Filed: Jan. 17, 1995

[30]     Foreign Application Priority Data

Sep. 19, 1994 [CA]  Canada ................................... 2125271

[51] Int. Cl.⁶ .............................. A47J 37/04; A47J 43/18
[52] U.S. Cl. .................. 99/427; 99/394; 99/421 A; 99/441; 99/450; D7/361; D7/409
[58] Field of Search .................... 99/323.5, 346, 99/394, 427, 447, 441, 339, 449, 419–421 V, 450; 126/506, 30; 219/389, 400, 395; D7/409, 402, 361, 669, 683, 325

[56]          References Cited

U.S. PATENT DOCUMENTS

| | | | |
|---|---|---|---|
| D. 199,712 | 12/1964 | Elliott | D7/409 |
| D. 245,219 | 8/1977 | Christen, Jr. | D7/361 |
| 1,976,989 | 10/1934 | Grimes | 99/346 |
| 2,136,658 | 11/1938 | Westberg et al. | 99/441 |
| 2,705,450 | 4/1955 | Steinbook | 99/421 H |
| 2,940,380 | 6/1960 | Rampel | 99/339 |
| 3,566,777 | 3/1971 | Koziol | 99/427 |
| 4,436,024 | 3/1984 | Arden et al. | 126/506 |
| 4,505,195 | 3/1985 | Waltman | 99/449 |
| 4,612,851 | 9/1986 | McManus | 99/421 A |
| 5,134,927 | 8/1992 | McCarthy, III et al. | 99/427 |
| 5,355,778 | 10/1994 | Mayfield et al. | 99/441 |

*Primary Examiner*—Timothy F. Simone

[57]          ABSTRACT

An improved tumble basket for use with a rotisserie is provided comprising a generally cylindrical basket having first and second ends. Attached to said first end, co-axial with said basket is means for supporting said first end on the barbecue and for in co-operation with a drive motor rotating the basket. This means consists of a square rod centrally attached to the said first end of the basket. Attached to said second end, co-axial with said basket, is handle means which support the basket on the barbecue and provide a handle for removing the basket from the barbecue after cooking. The handle means consists of a rod centrally attached to said second end of the basket with a insulated handle attached to the distal end of the rod. A hinged cover is provided with latch means that can be operated while the basket is hot without burning the operator's fingers.

4 Claims, 6 Drawing Sheets

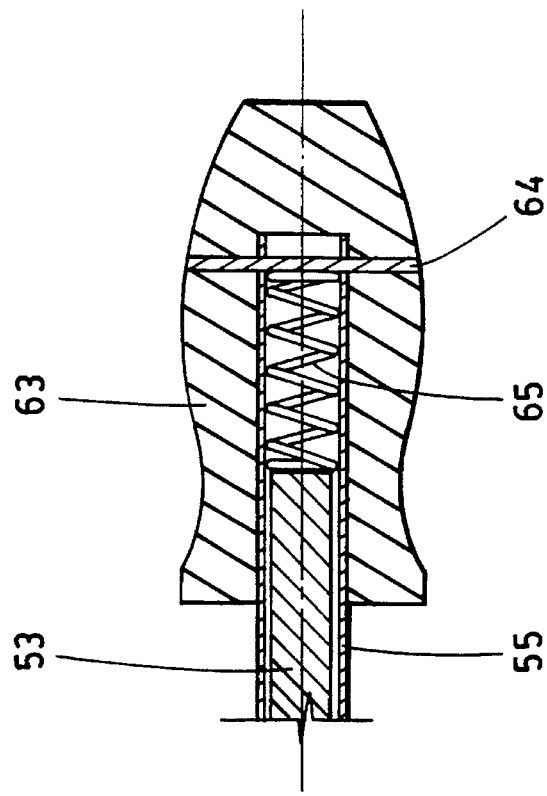
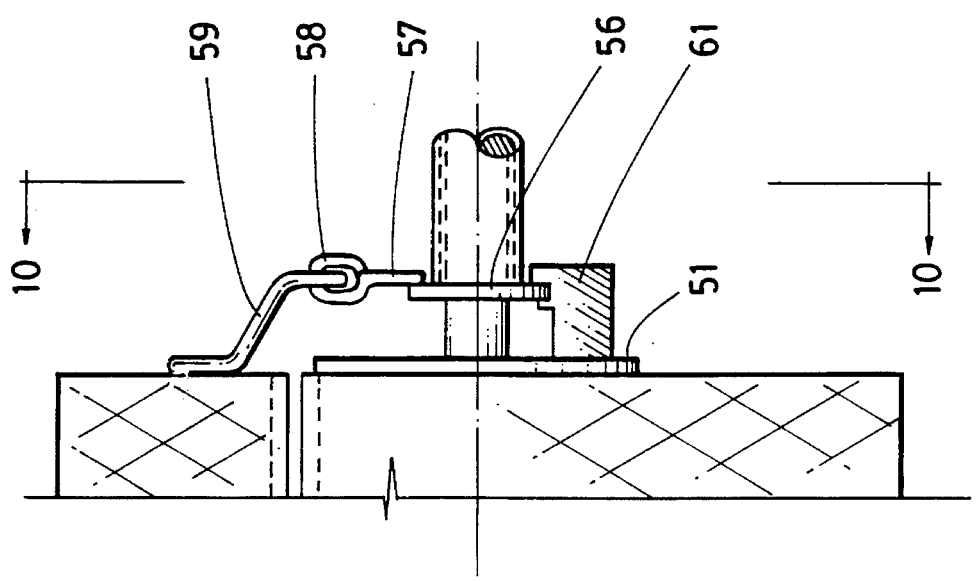

TUMBLER BASKET

BACKGROUND OF THE INVENTION

1. Field of the Invention

The present invention relates to improvements in devices for use as tumble baskets on rotisseries.

2. Description of the Prior Art

Tumble baskets for use with barbecue rotisseries are known. The most common type is a chrome plated wire basket having a generally hexagonal cross-section. Such baskets have two identical halves that when assembled on the spit of the rotisserie form the basket. The basket halves are secured on the spit and the spit must be removed to open the basket.

It is sometimes difficult to fit large pieces of meat or other foods to be cooked into the basket because the spit runs through the middle of the basket. In addition the food will not tumble freely resulting in uneven cooking or burning. In order to check whether the food is cooked it is necessary to remove the basket from the barbecue and remove the spit to open the basket.

SUMMARY OF THE INVENTION

An object of the present invention is to provide a tumble basket which requires no attachments to secure it to a rotisserie rod, can be easily opened to check the food inside without removal from the barbecue and that can be easily filled with food to be cooked.

Thus, in accordance with the present invention, there is provided an improved tumble basket for use with a rotisserie comprising a generally cylindrical basket having first and second ends. Attached to said first end, co-axial with said basket is means for supporting said first end on the barbecue and for in co-operation with a drive motor rotating the basket. This means consists of a square rod centrally attached to the said first end of the basket. Attached to said second end, co-axial with said basket, is handle means which support the basket on the barbecue and provide a handle for removing the basket from the barbecue after cooking. The handle means consists of a rod centrally attached to said second end of the basket with a insulated handle attached to the distal end of the rod. A hinged cover is provided with latch means that can be operated while the basket is hot without burning the operator's fingers.

Because the spit of the rotisserie does not extend through the basket it is relatively easy to fill the basket with large pieces of food that will tumble freely resulting in even cooking. The hinged cover and latch means also enables the food to be checked while it is still on the barbecue without disassembling the basket.

Further features of the invention will be described or will become apparent in the course of the following detailed description.

BRIEF DESCRIPTION OF THE DRAWINGS

In order that the invention may be more clearly understood, the preferred embodiment thereof will now be described in detail by way of example, with reference to the accompanying drawings, in which:

FIG. 8 is a front view of part of the latch mechanism of FIG. 5.

FIG. 9 is sectional side view of the handle shown in FIG. 4.

DETAILED DESCRIPTION OF THE PREFERRED EMBODIMENT

Figure 1:
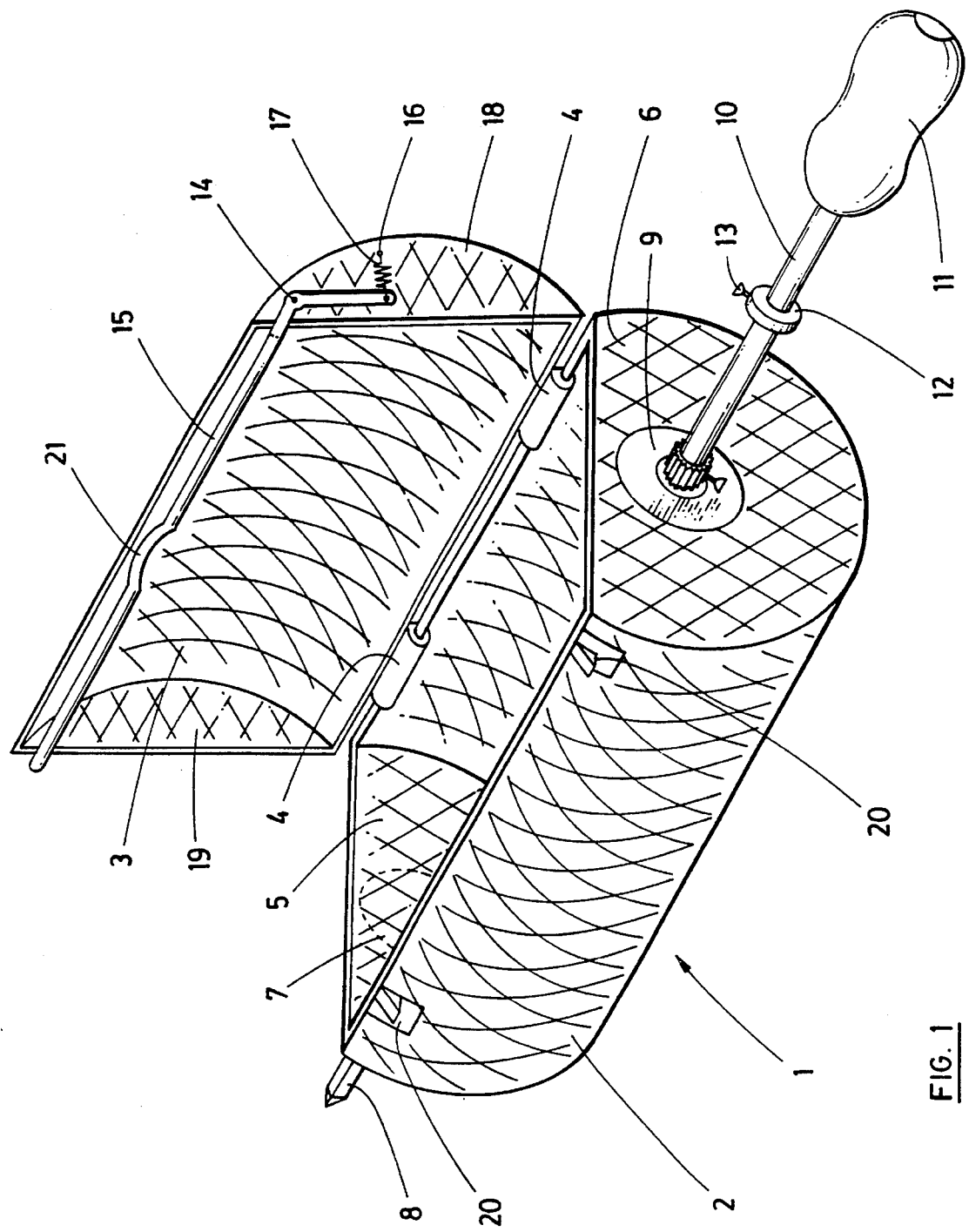
FIG. 1 is a perspective view of one embodiment of a tumble basket according to the present invention.
Figure 3:
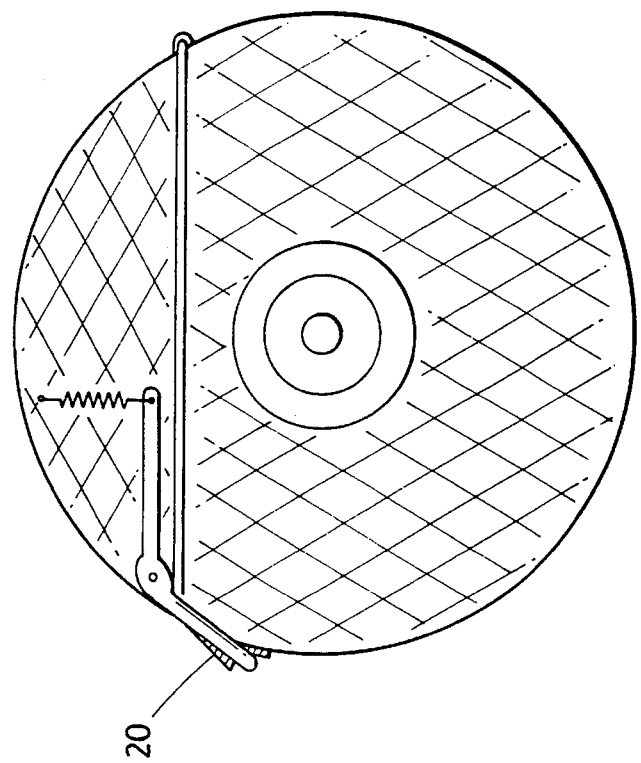
FIG. 3 is a right end elevation of the basket of FIG. 1.
Figure 2:
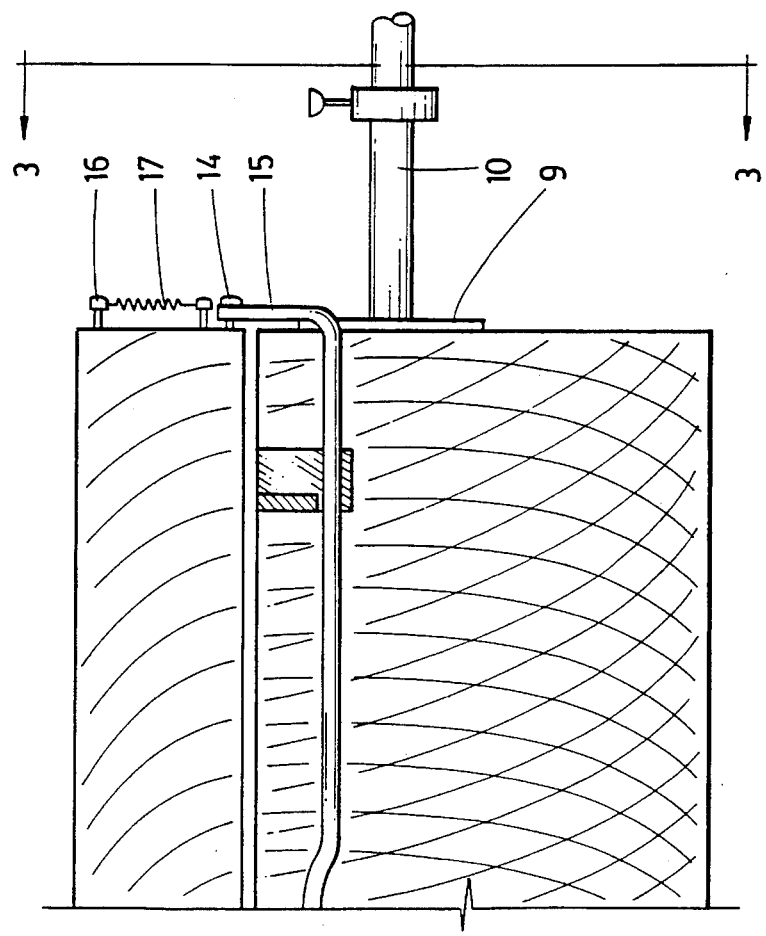
FIG. 2 is a shortened front elevation of part of the basket of FIG. 1.
Figure 4:
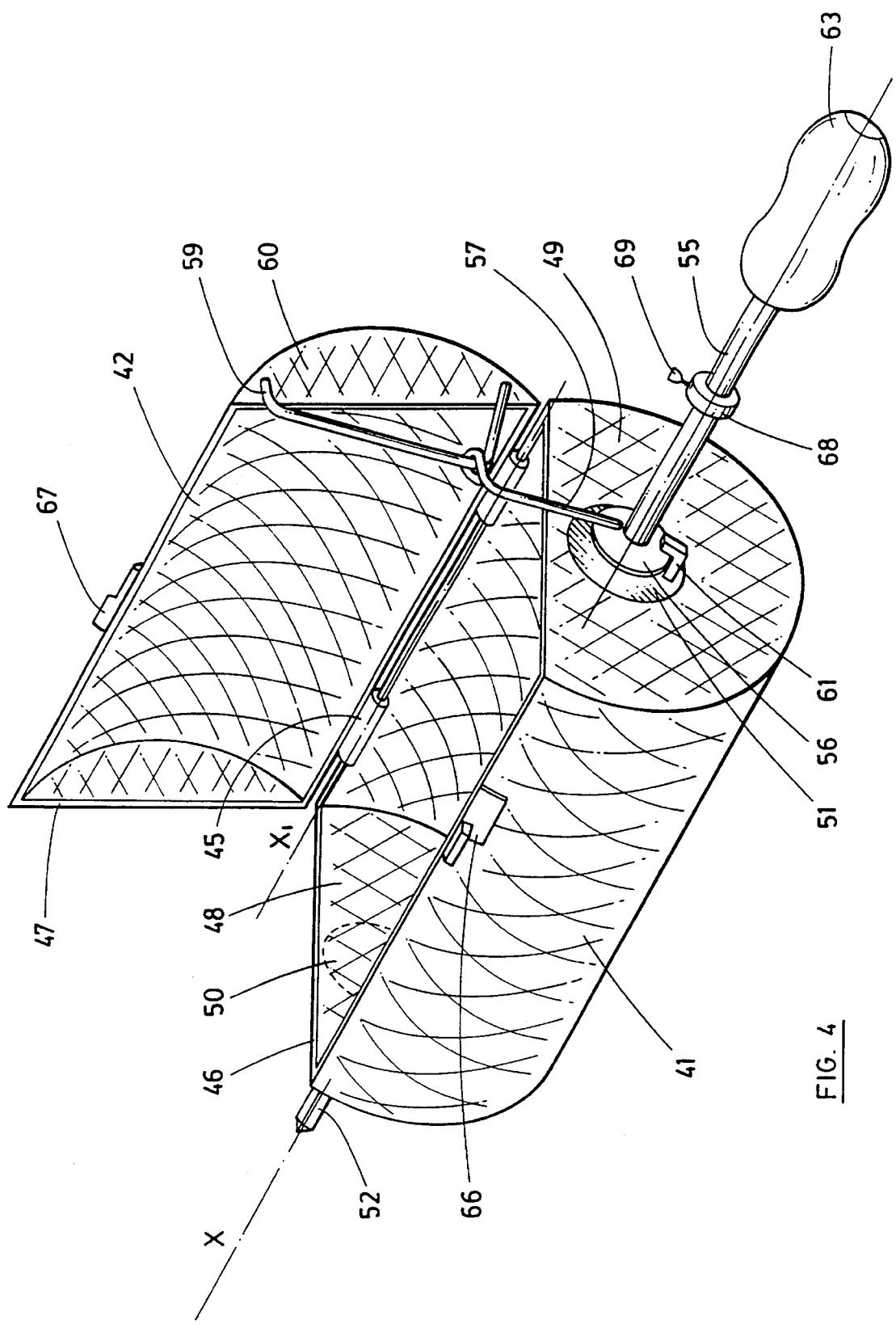
FIG. 4 is a perspective view of a second embodiment of a tumble basket according to the present invention.
Figure 5:
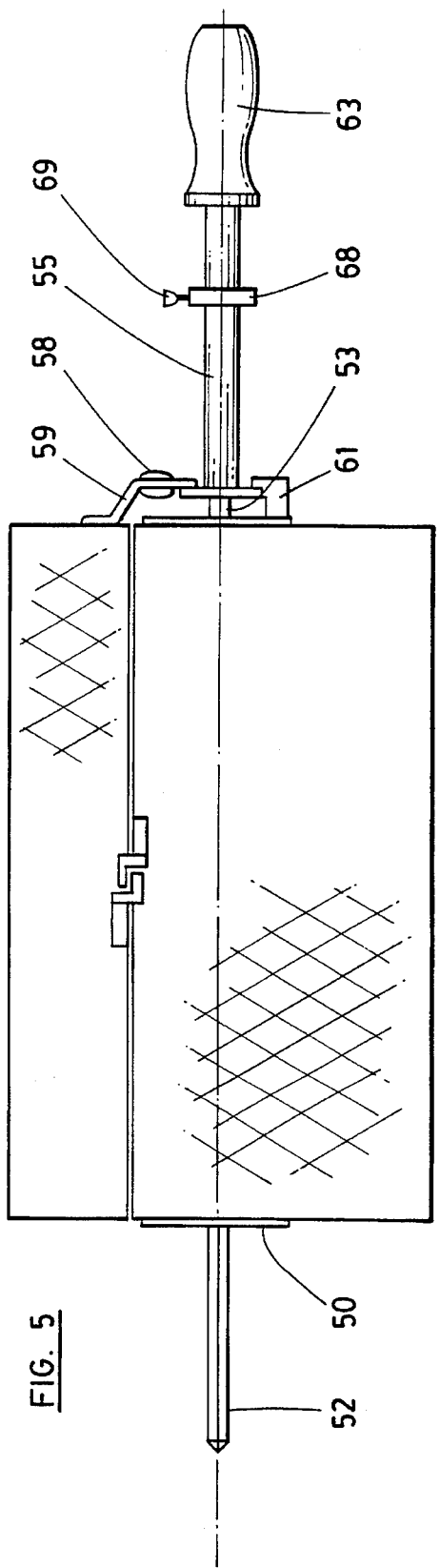
FIG. 5 is a partial front elevation of the basket of FIG. 4 having a latching mechanism.
Figure 7:
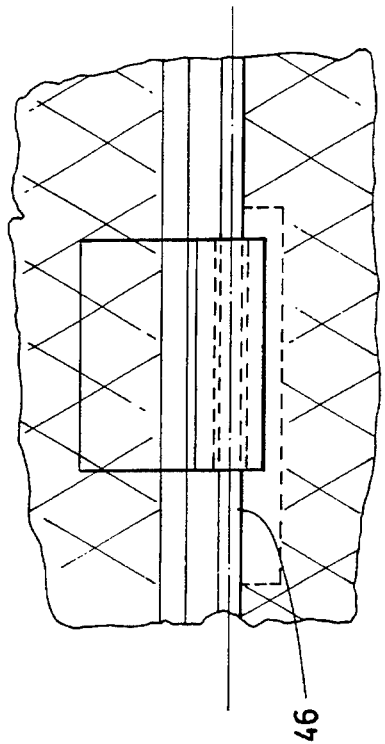
FIG. 7 is a front view of the latching mechanism of FIG. 6.
Figure 6:
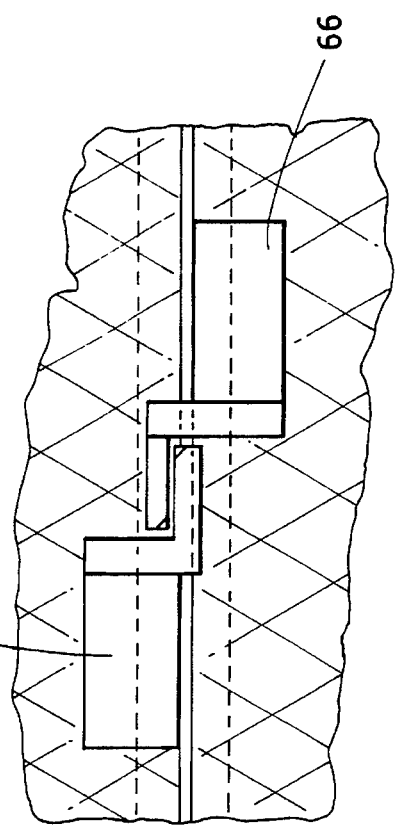
FIG. 6 is a front view of the latching mechanism shown in FIG. 5.
Figure 10:
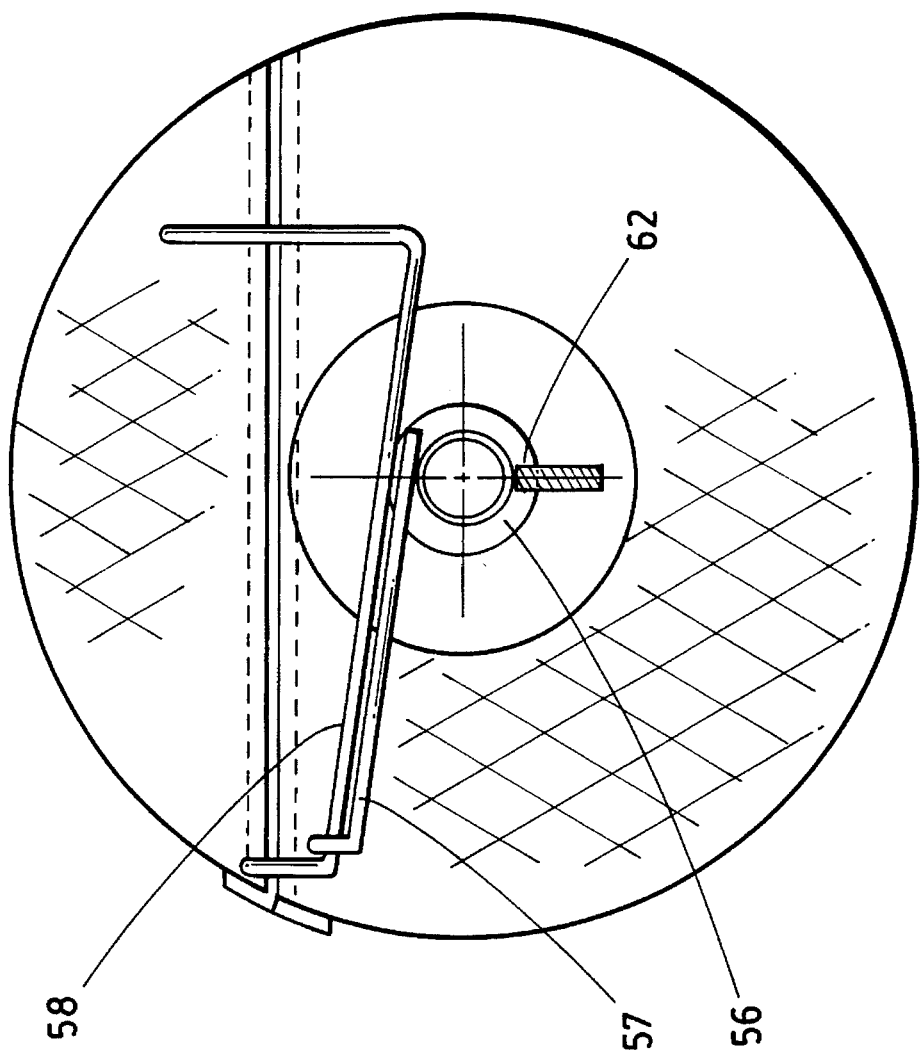
FIG. 10 is a right end view of the basket of FIG. 4.

Referring to FIGS. 1 to 3, the improved tumble basket of the present invention is generally indicated at 1. The basket is generally cylindrical and in the preferred embodiment constructed of stiff framed expanded metal. The basket comprises a basket section 2 and cover 3 that is attached to the basket section 2 on hinges 4. The basket section has first and second ends 5 and 6 respectively. On said first end 5, plate 7 is centrally mounted and to which rod 8 is affixed so that it is co-axial with said basket. The rod 8 preferably has a square cross-section so that when inserted into the drive socket of the rotisserie motor, the basket will rotate. Plate 9 is centrally mounted on the second end 6 of the basket section. A second rod 10 is detachably affixed to plate 9 so that it is also co-axial with said basket. The rod 10 can be either round or square. A handle 11 is provided at the end of rod 10. The handle is made of wood or other insulating material so that the basket can be easily removed from the barbecue when hot. Ring 12 and screw 13 are slidably mounted on rod 10 so that the position of the basket can be adjusted for different sizes of barbecues. Bar 15 is pivotally mounted to the cover 3 at points 14. The bar 15 is biased by spring 17 which is attached to the ends 18 and 19 of cover 3 with pins 16. Projections 20 on the left and right side of the edge of basket section 2 adjacent its front top edge, hook on to bar 15 when the cover is closed. Means is provide in the centre of bar 15 to permit the bar to be unhooked from projections 20 by a fork or some other similar tool. Said means in the preferred embodiment consists of a bend 21 in bar 15.

The tumble basket serves for preparing any food desired for the barbecue. Easy to use and will not result in any burns or injuries checking the food. To operate the basket one must open the basket by simply flipping the cover up. One can use finger to this when the basket is cold, but if the basket is hot one must use some kind of tool such as a fork to flip open the cover.

In preparing the food for the barbecue tumbler, only two steps are required. Open the basket and fill with all the desired foods prepared for barbecuing, all at one time. Periodic checking is the only requirement. If although one needs to check or add or take away from the basket all that one must do is switch off the rotisserie motor and flip open the cover and check or add or take away! No messy taking apart.

In an alternative embodiment as shown if FIG. 4 to 10, a cylinder shaped basket 41 constructed of a stiff flatten expanded metal is provided with a cover 42 that opens on hinges 45. Both the basket 41 and cover 42 are reinforced at edges 46 and 47. The basket 41 has first and second ends 48 and 49. Mounted on said first and second ends 48 and 49 are metal plates 50 and 51 which are located on the x-axis of the entire construction. Mounted to plate 50 co-axial with the basket is support rod 52. Rod 52 is preferably square to facilitate use with a drive motor in order to rotate the basket. Mounted on plate 51 is rod 53 which is also co-axial with the basket and may be round.

As best shown in FIG. 9 pipe 55 covers rod 53 in a slidable engagement to permit lateral movement. Ring 56 is fixed to the end of pipe 55 adjacent to plate 51. Attached to ring 56 is arm 57 which forms loop 58 at its distal end. A second arm 59 is attached to the adjacent end 60 of cover 42 and passes through loop 58. Finger 61 is attached to plate 51 and serves as a key like feature in the structure for the opening and closing of cover 2 when interacting with notch 62. Handle 63 is attached to pipe 55 with pin 64. In pipe 55 between pin 64 and rod 53 is spring 65 serving to bias the handle between rod 53 and pin 64. Hinges 45 are adapted to allow cover 2 to move laterally along the x axis. Hooks 66 and 67 attached to the adjacent edges of the basket and cover respectively act as a lock once they are hooked together. Ring 68 with screw 69 act as an adjustment for the location of the basket on barbecues of different sizes.

To operate the basket one must open the basket by pushing the handle in which causes the cover to move lateral on the hinges thereby unlatching hooks 66 and 67. By turning the handle clock wise cover 2 is opened as arms 57 and 59 co-operate to rotate the cover on the hinges. To close the cover merely push the handle in and turn it counter-clockwise.

It will be appreciated that the above description related to the preferred embodiment by way of example only. Many variations on the invention will be obvious to those knowledgeable in the field, and such obvious variations are within the scope of the invention as described and claimed, whether or not expressly described.

What is claimed as the invention is:

1. A tumble basket for use with rotisseries having a rotisserie motor comprising:
   a) a generally cylindrical basket section having first and second ends and a hinged cover;
   b) first support means attached to said first end of said basket section to support the basket section and in co-operation with a rotisserie motor cause the basket section to be rotated when in use wherein said first support means comprises a square rod co-axial attached to said first end of the basket section;
   c) second support means attached to the second end of said basket section adapted to support the basket section;
   d) a handle attached to said second support means to permit removal of the basket from the rotisserie when hot without burning the user's hands wherein said second support means includes a round rod co-axial attached to said second end of the basket section and wherein the distal end of said round rod is slideably engaged within a pipe member wherein said handle is spring mounted to said pipe member; and
   e) latch means to keep the cover closed on the basket when in use.

2. The basket of claim 1 wherein means are provided so that on rotation of said handle the cover swings open to permit filling or emptying the basket.

3. The basket of claim 2 wherein means are provided so that by pushing the handle towards the basket the cover moves laterally to unlatch the latch means.

4. The basket of claim 2 wherein the means to open the cover on rotation of the handle includes an annular ring fixed to the end of the pipe member, a first arm attached to said ring having a loop at its distal end and a second arm attached to the second end of the cover and passing through the loop on said first arm.

* * * * *